B. W. TUCKER.
LOADING AND UNLOADING APPARATUS.
APPLICATION FILED MAR. 7, 1908.

1,044,301.  Patented Nov. 12, 1912.
9 SHEETS—SHEET 1.

B. W. TUCKER.
LOADING AND UNLOADING APPARATUS.
APPLICATION FILED MAR. 7, 1908.

1,044,301.

Patented Nov. 12, 1912.
9 SHEETS—SHEET 4.

UNITED STATES PATENT OFFICE.

BENJAMIN W. TUCKER, OF NEWARK, NEW JERSEY.

LOADING AND UNLOADING APPARATUS.

1,044,301.  Specification of Letters Patent.  Patented Nov. 12, 1912.

Application filed March 7, 1908. Serial No. 419,743.

*To all whom it may concern:*

Be it known that I, BENJAMIN W. TUCKER, a citizen of the United States, and a resident of Newark, county of Essex, and State of New Jersey, have invented certain new and useful Improvements in Loading and Unloading Apparatus, of which the following is a full, clear, and exact description.

This invention relates more particularly to an apparatus for loading and unloading vessels.

The primary object of the invention is to provide a simple, strong and efficient apparatus, which may be suitably supported from the masts or booms of the vessel above the deck and held to the deck rigidly in its suspended position, or to permit the said apparatus to be readily swung to various positions to adapt it for loading or unloading from either side of the vessel; and to provide means whereby the apparatus may be under absolute control of the operator and so constructed that the working or loading and unloading means, independent of the frame, may be lengthened or shortened to adapt the apparatus to unload or load from different or varying heights according to the distance the packages, boxes or other freight is to be transferred, thus compensating for the rise and fall of the tide, or for the removal of the freight.

Another object of the invention is to provide an apparatus which is complete in all its detail and which has a motor mounted thereon, and which is so constructed that the means, as a chain, for carrying the freight or material to be transferred will not in any way interfere with the apparatus as said chain is suitably supported on the frame so as to travel along suitable tracks while transferring the material and in moving to a position to receive the material to be transferred.

A further object of the invention is to provide simple and effective means whereby an endless carrier as a chain, may be employed for transferring purposes, and which is so operated that a slack in the form of a loop may be provided at either or both ends of the apparatus, and so controlled that the said slack may be utilized to lengthen or shorten the working part of the carrier which loads or unloads the material, and which slack portion or supplemental loop is absolutely under the control of the operator to quickly and readily permit material to be transferred from any desired height or depth.

With these and other objects in view, the invention will be hereinafter more particularly described with reference to the accompanying drawings, which form a part of this specification, and will then be pointed out in the claims at the end of the description.

While I have shown the invention as applied to a particular purpose and supported in a certain way, it will be understood that the said apparatus may be arranged in any desired manner and used for any purpose for which it is adapted, and that the construction of the frame work may be changed to adapt it for any purpose for which it may be used.

Figure 7:
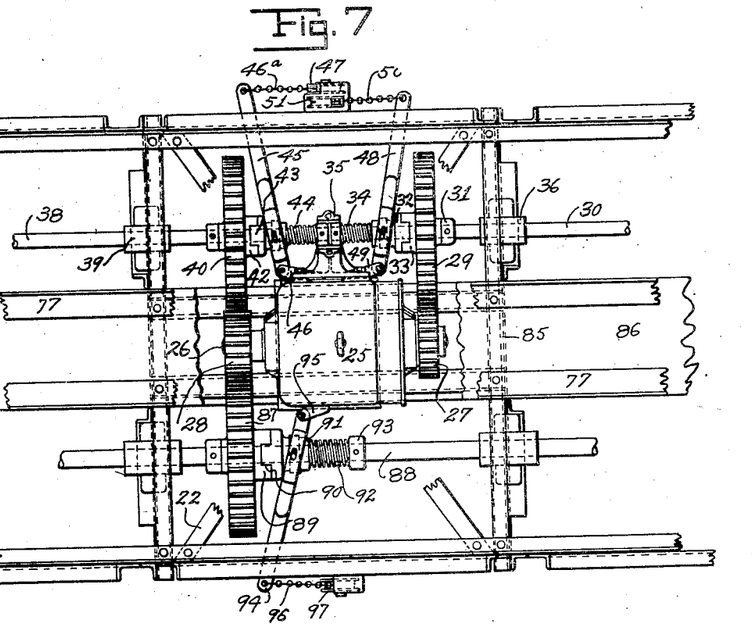
Fig. 7 is a fragmentary plan view, partly broken away, showing the motor and part of the mechanism for controlling the endless chain or carrier.
Figure 13:
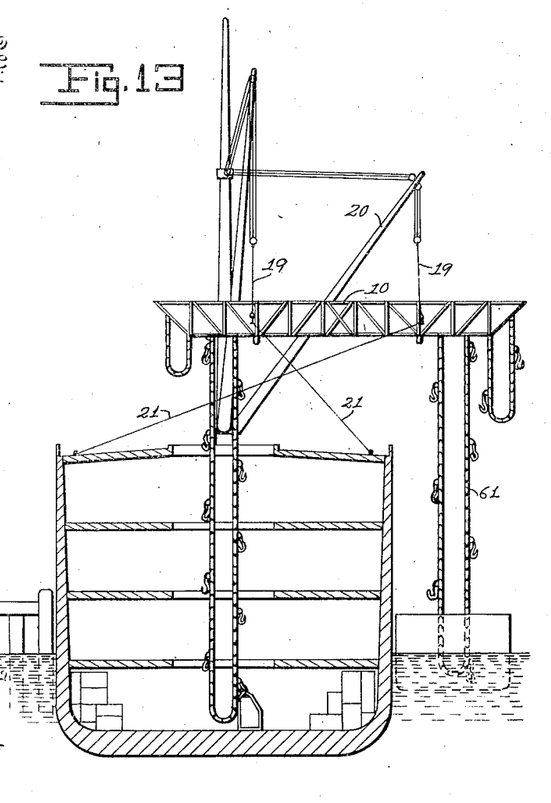
Fig. 13 is a transverse section of a vessel, showing the apparatus suspended above the deck and transferring freight from the vessel to a lighter or from the lighter to the vessel.
Figure 14:
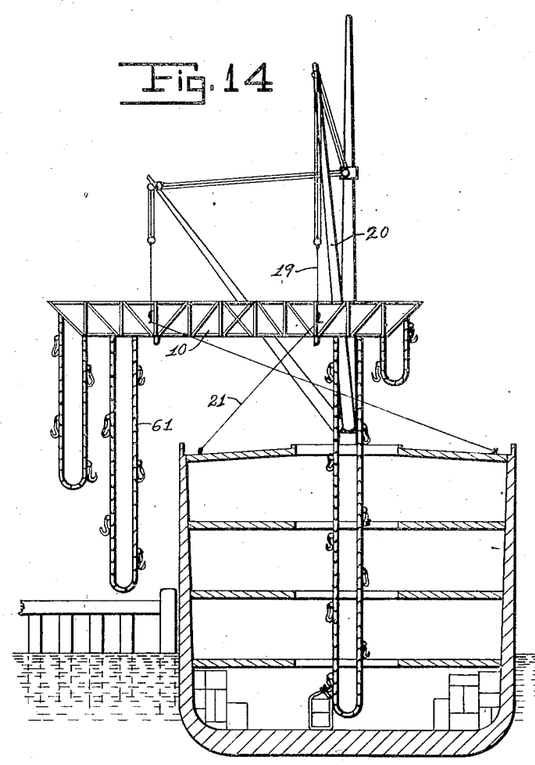
Fig. 14 is a similar view of Fig. 13, except that the apparatus is shown as loading or unloading the freight from a dock to the vessel or the vessel to a dock.
Figure 15:
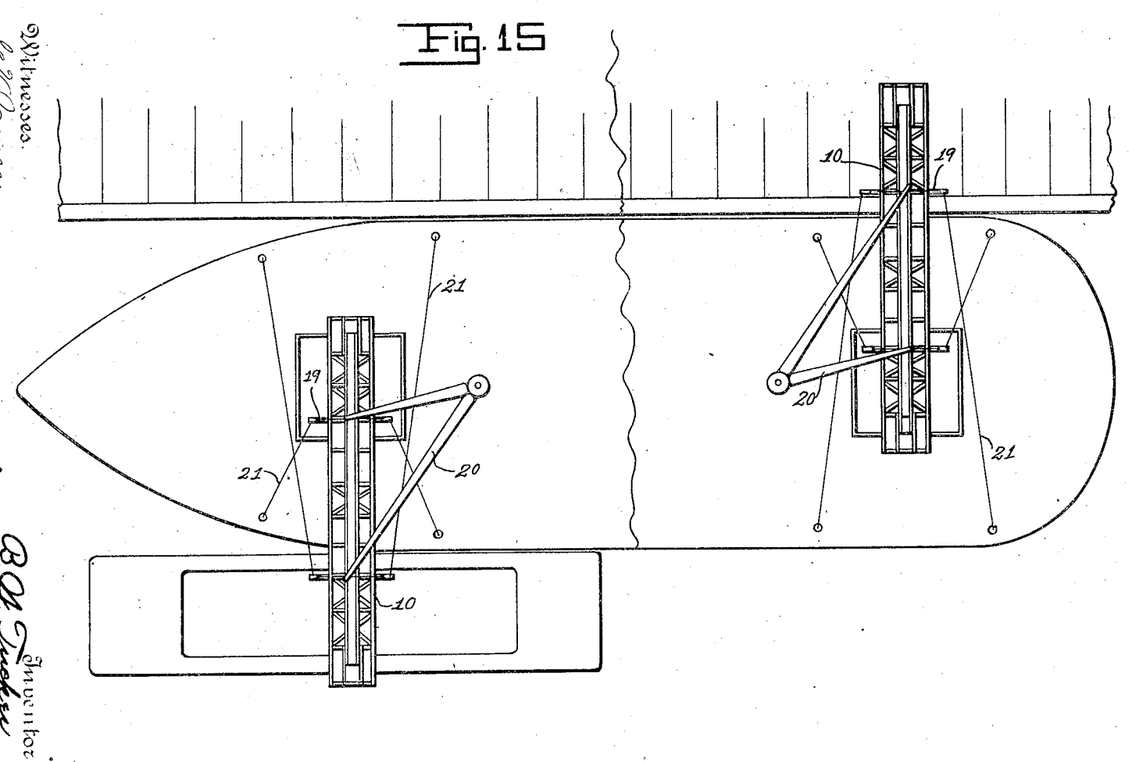
Fig. 15 is a plan view of a vessel having two of the apparatus, one in the fore and the other in the after part of the vessel, showing how freight may be transferred between the dock and vessel or between the vessel and a lighter.

The frame 10 may be of any desired form and constructed in any preferred way. As shown the frame has upper longitudinally-extending beams 11 in the form of angle irons, and similar lower beams 12 somewhat shorter than the beams 11 but parallel thereto, and said beams are held together by vertical tie-bars 13, and angularly disposed tie-bars 14 in a manner substantially the same as in bridge or building construction. The said parts are so held together at their joints by tie-plates 15, or otherwise, that a very strong, effective and light frame is provided which is substantially oblong in form. This frame 10 is provided with outwardly-extending arms 16 on opposite sides of the transverse center thereof, and said arms may form a continuation of certain of the transverse beams 17, the number of which vary according to the size of the apparatus, and said transverse beams may be held to the vertical tie-bars 13. The arms 16 may be provided with eyes or clips 18 at both the upper and lower sides thereof, and to said eyes may be held the guy ropes or cables 19 by which the said frame may be suspended from the boom or booms 20 of the vessel, and to the lower eyes or clips 18 are held the guy ropes or cables 21 whereby the apparatus may be lashed to the deck of the vessel and rigidly held at any suitable distance above the deck as shown best in Figs. 13 and 14. By this means the apparatus may be raised and placed in position for loading or unloading, and may be quickly lowered to the deck while not in use. The frame is braced centrally thereof by means of additional tie-rods and beams 22 which may extend transversely, lengthwise and angularly to suitably brace and hold the parts together, and supported on the beams 23 is a platform 24. On the platform 24 is a suitable motor 25 of any suitable construction. The motor shown is electric, and of the usual type employed in connection with traveling cranes, and has its shaft 26 provided with pinions 27 and 28. The pinion 27 is in mesh with the gear 29, and this gear is loosely held on a supplemental shaft 30 between a collar 31 and a clutch member 32. This clutch member is keyed to slide on the shaft 30, and is normally forced into engagement with the clutch teeth 33 of the gear 29 by means of a spring 34, by which the said shaft 30 may be rotated when the clutch member 32 is in the position shown in Fig. 7. The shaft 30 extends lengthwise of the frame, and is supported at one end in a bracket 35, projecting from the motor casing, and is journaled in suitable bearings 36 located at any desired point on the frame of the apparatus. The shaft 30 extends lengthwise of the frame on one side of the motor, and extending on the opposite side of said motor and in alinement therewith is a similar supplemental shaft 38. This shaft 38 is suitably journaled in bearings 39, and adjacent to the motor is provided with a clutch gear 40, similar to the gear 29, and said clutch gear 40 is in mesh with the pinion 28 on the end of the motor shaft opposite to that of the pinion 27. The clutch gear 40 has its clutch member 42 normally engaged by the clutch member 43, and this latter clutch member is slidingly held on the shaft 38, and is normally forced inward into engagement with the loose clutch gear 40 by means of a spring 44, so that when the clutch is engaged as shown in Fig. 7, the said shaft 38 will be rotated. The shaft 38 has its end journaled in the bracket 35 in the same manner as the shaft 30, and the two shafts are thus in alinement or form a continuation of each other and are adapted to be operated in unison or independently. A shifting lever 45 is pivoted to a bracket 46 at one end, and is slidingly connected to the clutch member 43, and to the other end of said lever 45 is connected an operating chain 46ᵃ, which passes around a sheave or pulley 47 supported on the frame and then extends downward, so as to be convenient to the operator. The clutch member 32 is operated by a lever 48 similar to the lever 45, and said lever 48 is pivoted at its inner end to a bracket 49 on the motor casing, and at its outer end is connected to a chain or cable 50, which passes around the sheave or pulley 51 located on the frame and also extends downward so as to be in convenient reach of the operator. It will be seen that as the motor is operated the pulleys and gears 29 either or both of the chains 46ᵃ and 50 are in engagement as shown in Fig. 7, and when either or both of the chains 46ᵃ and 50 are operated to release the clutch members from the gears on said shafts 30 and 38, the said shafts may be rotated independently of each other or stopped entirely according to the position of the clutch members.

Figure 1:
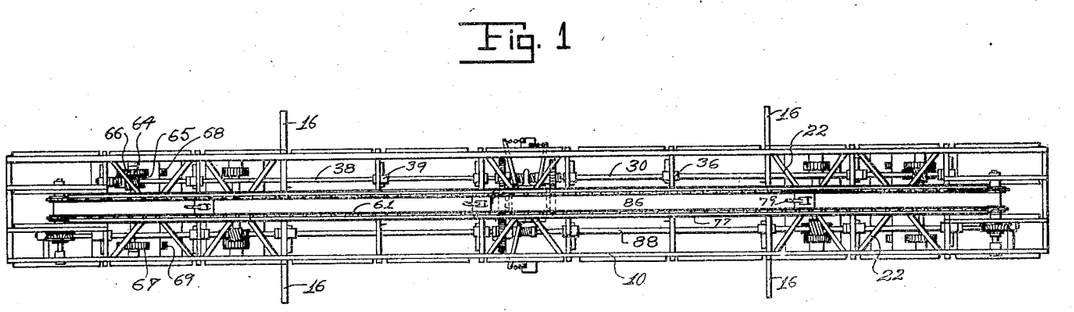
Figure 1 is a plan view of one form of apparatus embodying my invention.
Figure 2:
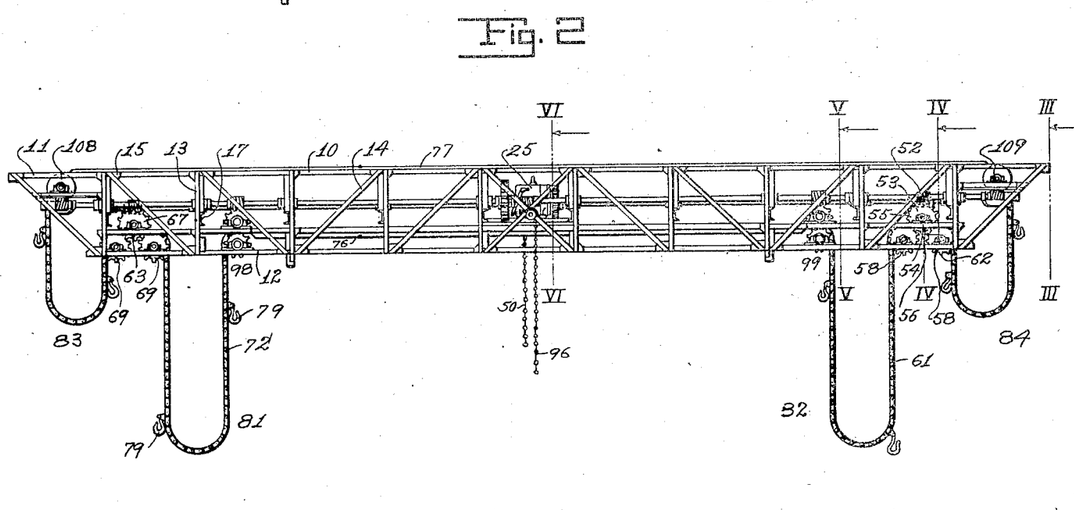
Fig. 2 is a side elevation.
Figure 3:
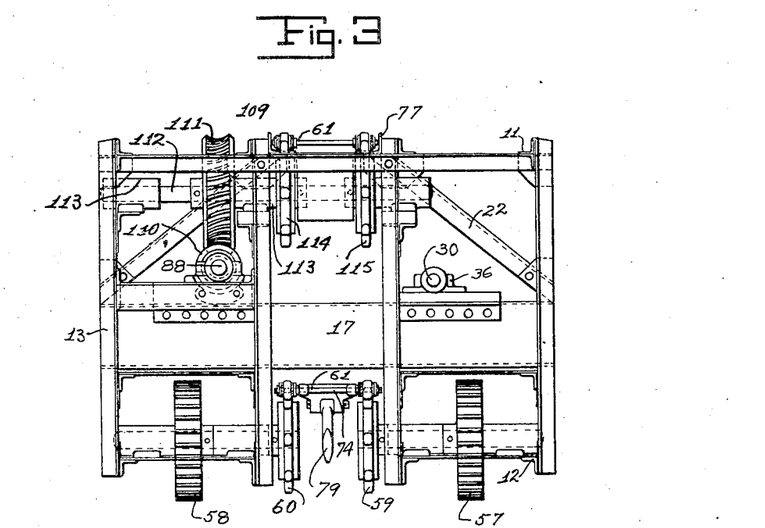
Fig. 3 is an end view on an enlarged scale showing the endless carrier or conveyer in section, the view being taken on the line III—III of Fig. 2.
Figure 4:
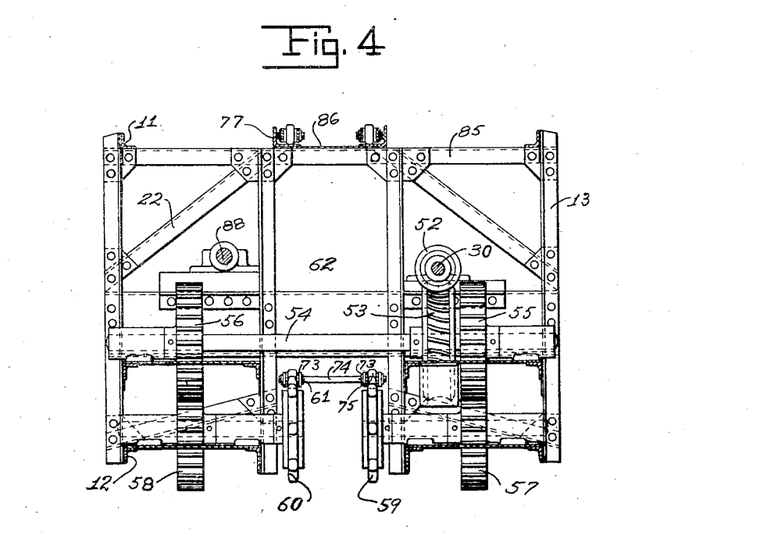
Fig. 4 is a vertical transverse section, partly in elevation, taken on the line IV—IV of Fig. 2.
Figure 5:
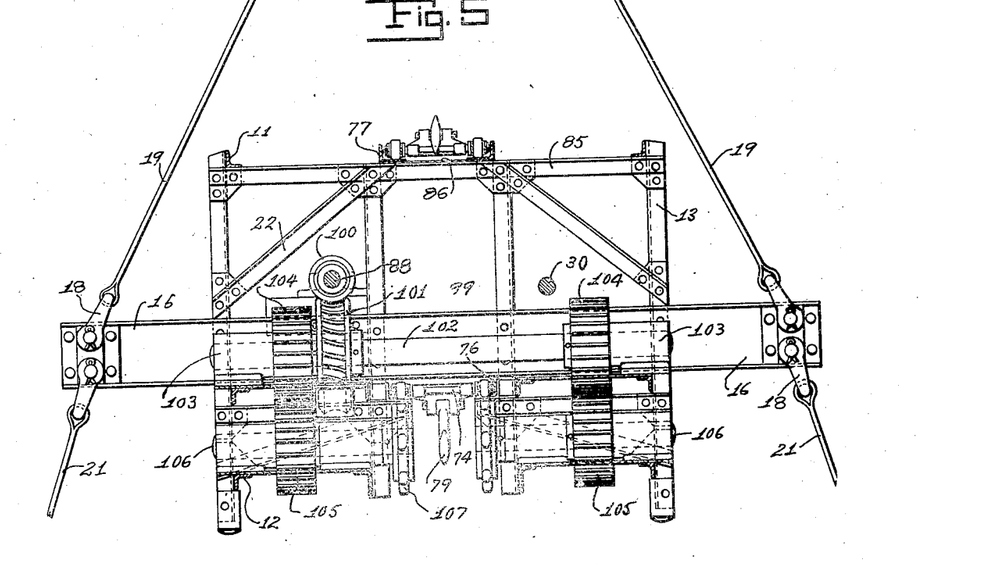
Fig. 5 is a vertical transverse section taken on the line V—V of Fig. 2, showing one means for supporting the apparatus.
Figure 6:
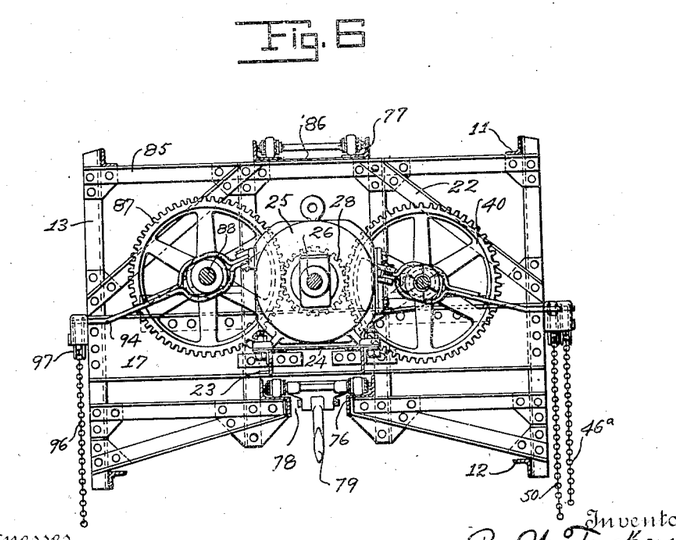
Fig. 6 is a vertical transverse section taken on the line VI—VI of Fig. 2.
Figure 8:
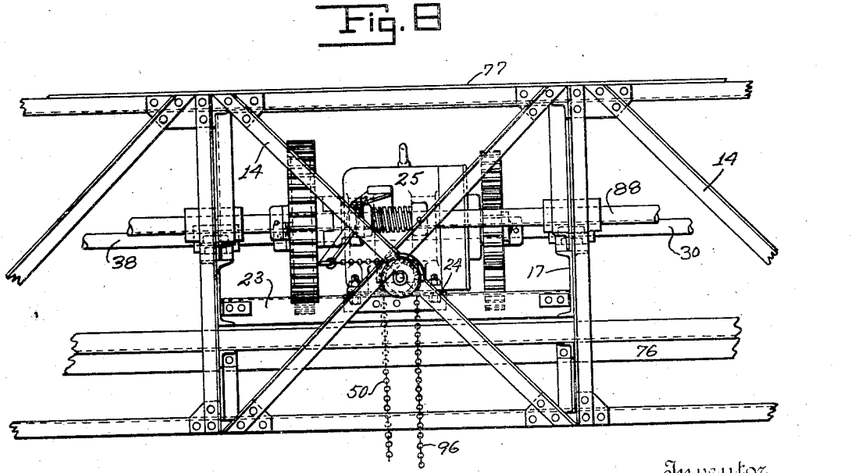
Fig. 8 is a side elevation of the central part of the apparatus shown in Fig. 7.
Figure 9:
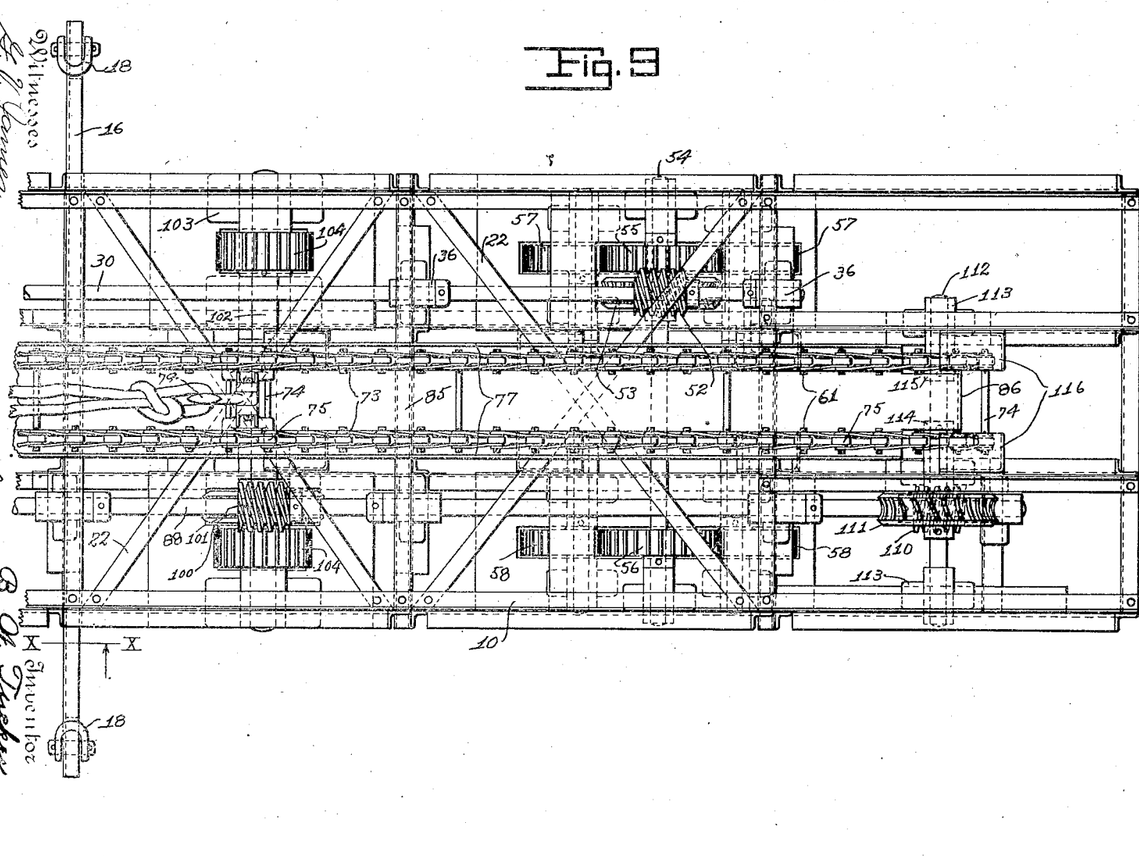
Fig. 9 is a plan view of one end of the apparatus.
Figure 10:
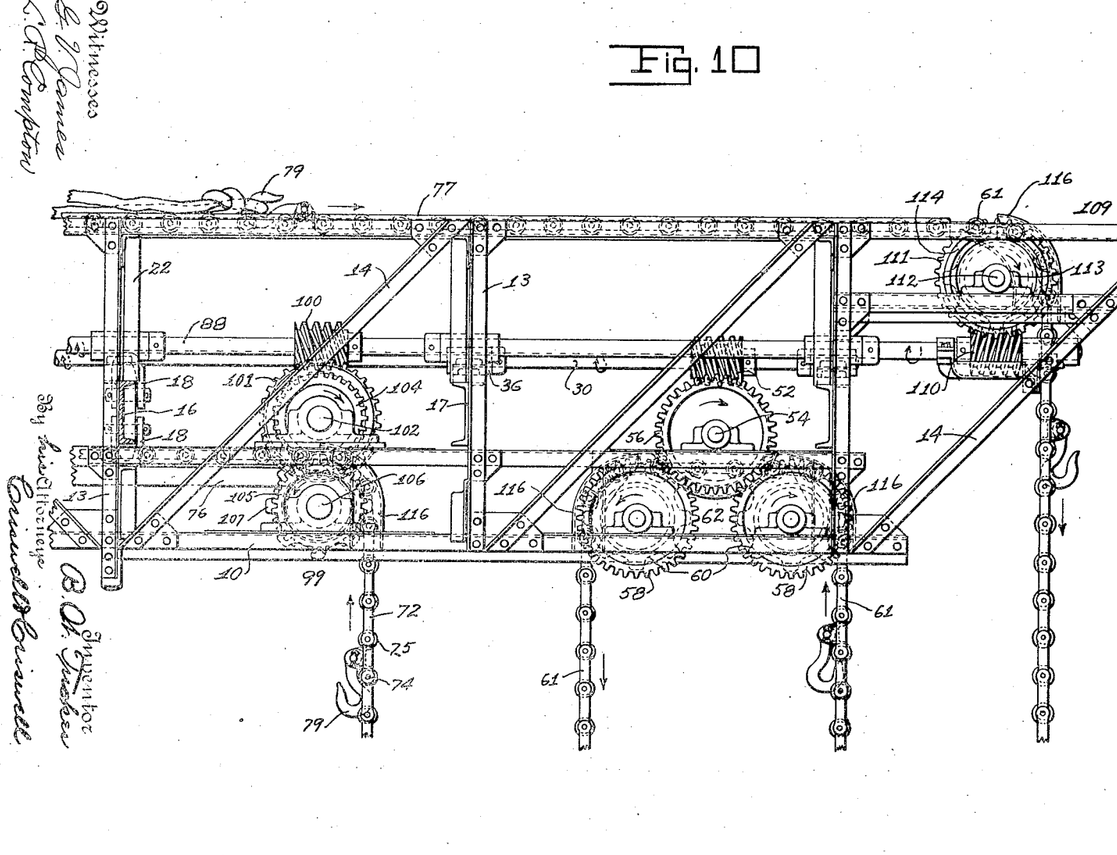
Fig. 10 is a side elevation of the end of the apparatus shown in Fig. 9.
Figure 11:
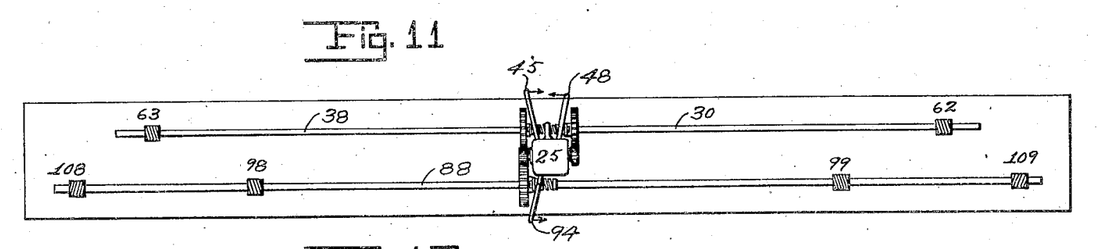
Fig. 11 is a plan view, partly diagrammatic, showing the several combinations of operations that may be made for controlling part or all of the endless carrier.

The supplemental shaft 30 at or near its outer end is provided with a worm 52, and this worm is in mesh with a worm gear 53. On the shaft 54 of the worm gear is arranged a spur gear 55, and this shaft 54 extends transversely of the frame, and has a similar spur gear 56 at its opposite end. The spur gears 55 and 56 each mesh with two gears 57 and 58 on opposite sides of the frame, and the shafts of these gears are provided with sprockets 59 and 60 respectively (Fig. 8) around which an endless chain or conveyer 61 is adapted to pass and to be moved by said sprockets when the shaft 30 is rotated, the said spur and worm gears and the sprockets forming an operating mechanism 62. A similar mechanism 63 to that of 62 is provided at the opposite end of the frame, and this mechanism is operated by the shaft 38, and is so arranged as to move the carrier or chain 61 in the proper direction. The shaft 38, Figs. 1 and 2, is provided with a worm 64 which operates a worm gear 65, and on the shaft of said worm gear is a spur gear 66. The shaft of the worm gear and spur gear extends transversely of the apparatus, and on the opposite end of said shaft is provided with a spur gear 67, and said gears 66 and 67 mesh with the gears 68 and 69, and on the shaft of these latter gears are arranged sprocket wheels around which passes the chain as in the mechanism 62.

Any suitable carrier or transferring means or devices carried thereby may be employed. As shown the carrier or transferring means is in the form of an endless chain 61, and said chain comprises a plurality of links 72 suitably joined together and forming two parallel members 73 which are joined at suitable distances apart by the rods 74 on the ends of which may be arranged rollers 75 which are adapted to travel along the lower tracks 76, and the upper tracks 77. Each track comprises two members, and the members or rails of the lower track are supported along the beams of the frame in such a way as to provide an open space 78, which extends the entire length of the apparatus at the lower part thereof, so that the means for holding the freight or whatever is to be transferred may be properly supported by the carrier so as to provide a free passage therefor. As shown the carrier chain is provided with hooks 79 which are suitably supported on the transverse rods 74, and are of such a nature that they will normally hang in position to have the packages or other material to be transferred quickly attached thereto, though instead of the hooks any other suitable means may be employed according to the nature of the material to be transferred. The carrier chain is provided with two main working loops 81 and 82 which may be of any desired length and serve as a part of the chain which receives or unloads the freight, and said chain passes around the mechanism 62 at one end, and the mechanism 63 at the opposite end, and is there provided with a supplemental or slack loop 83 at one end of the frame, and a supplemental or slack loop 84 at the other end of the frame. These slack loops may be of any desired length, and are intended to serve as slack or surplus in the chain for the purpose of lengthening or shortening either of the main working or transferring loops 81 and 82 when the mechanism is operated as will be hereinafter described. The chain or carrier after forming the slack loops passes along the rails 77, and under the rails may be arranged suitable braces 85, and a plate or beam 86, as it is not necessary that the frame be open at the top thereof for the reason that the chain travels above the same and the hooks 79 in this position are uppermost.

To positively drive the carrier or endless chain 61 the pinion or gear 28 of the motor shaft is made to mesh with the gear 87 on a longitudinally-extending main driving shaft 88. This gear 87 is loosely held on the shaft 88 and is provided with a clutch member 89 of the clutch 90, and said clutch has a member 91 which is slidingly held on the shaft 88 so as to normally rotate with said shaft, and said member 91 is normally held in engagement with the clutch member 89 by means of a spring 92 interposed between the member 91 and a collar 93, so that the gear and shaft will normally rotate in unison. A clutch lever 94 is pivoted at 95 to the motor casing and is held to the member 91 of the clutch, so that it may release the gear 87 from rotating the shaft 88 when said clutch lever is operated. A chain or cable 96 passes around a sheave 97 and extends downward convenient to the operator so that said clutch lever 94 as well as the levers 45 and 48, may be operated at will to cause either or any of the shafts 30, 38 or 88 to be stopped. The shaft 88 extends substantially the entire length of the frame, and is adapted to operate the mechanism 98 and the mechanism 99 located on opposite sides of the motor. Each mechanism comprises a worm 100 located on the shaft 88 which operates the worm gear 101, and said worm gear is held to a shaft 102 which extends transversely of the frame above the track 76. The transverse shaft 102 is suitably journaled in bearings 103 and adjacent to each bearing is a gear 104 which meshes with similar gears 105. These gears 105 are each held to a short shaft 106 located beneath the rails 76, and on the inner end of each of said shafts 106 is held a sprocket wheel 107 which serves to drive the chain or carrier at a point adjacent to the working loops 81 and 82.

At or near each end of the shaft 88 is a mechanism 108 located at one end, and a similar mechanism 109 located at the other end. Each of the mechanisms 108 and 109 comprise a worm 110 which is secured to the shaft 88 and this worm is in mesh with and rotates a worm gear 111. The worm gear 111 is secured to a transverse shaft 112, and said shaft 112 is suitably journaled in bearings 113 carried on the frame, and is provided with sprocket wheels 114 and 115, which engage the links of the carrier or chain 61 at the extreme part of the supplemental or slack loops 83 and 84. Each sprocket wheel may be provided with a guard 116 to prevent the chain from becoming disengaged from the teeth of said wheels. By providing worms and worm gears as a part of the driving mechanisms, independent locking means is not necessary for the reason that said worms cannot be driven by any weight that might be placed on the carrier.

Figure 12:
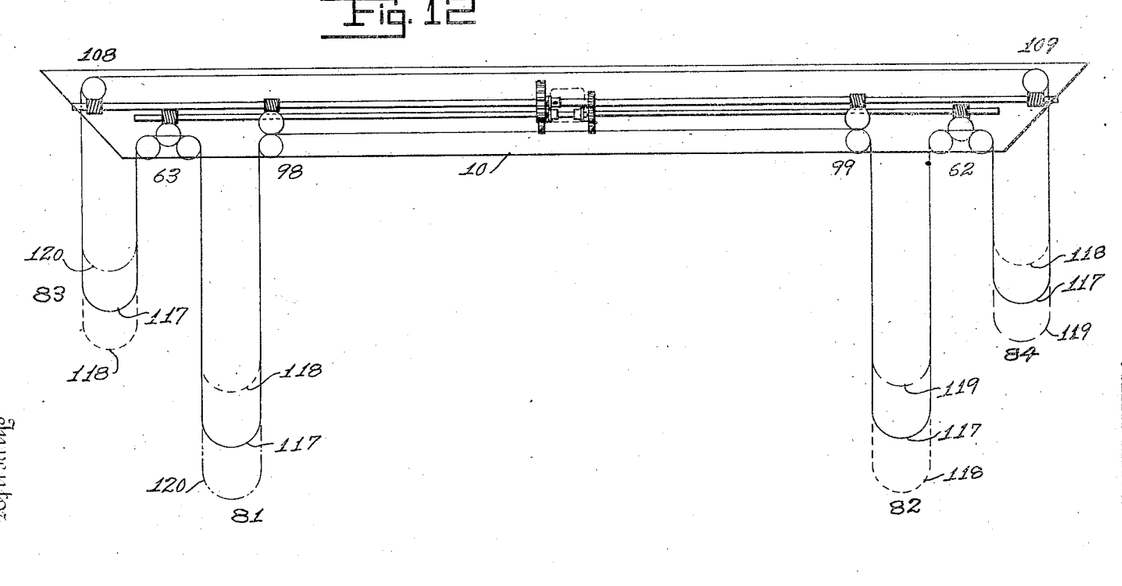
Fig. 12 is a side elevation, partly diagrammatic, showing various positions of the loops when certain parts of the mechanism are operated.

It will be seen that various combinations may be obtained so that either of the working loops 81 and 82 or both of them may be lengthened or shortened at will by lengthening or shortening the supplemental or slack loops 83 and 84. If the motor is operated to drive the shafts 88, 30 and 38, the different mechanisms connected therewith will move the endless chain or carrier of regularly and without any change in the length of said loops as shown in full lines 117 of Fig. 12. If for example the clutch lever 94 is operated to stop the shaft 88, and the shafts 30 and 38 operated, the working or the slack loops will be lengthened or shortened according to the direction of rotation of the motor, it, of course, being understood that the motor may be operated in either direction. This operation of the shafts 30 and 38 imparts movement to the mechanisms 62 and 63 as already described, and through them will operate the chain in such a way as to lengthen one loop and shorten the other according to the direction of rotation of the shafts as indicated by line 118 in Fig. 12. If the lever 48 is operated to stop the shaft 30 so that only the shafts 88 and 38 operate, the effect of this would be to operate the mechanism 63 and mechanisms 98, 99, 108 and 109 so that the slack or working loop at the same end of the frame may be shortened or lengthened according to the direction of rotation of the motor, as indicated by line 119. Then again if lever 45 is operated to stop the shaft 38 so that the shafts 30 and 88 be operated, these shafts through the mechanisms will effect the same result as that just described on the opposite end of the frame as indicated by line 120. If on the other hand levers 45 and 48 are operated so that shaft 88 only is rotated, the effect of this action through the mechanisms 98, 99, 108 and 109 will be to change the length of the working loop at either end, so as to lengthen one and shorten the other according to the direction of rotation of said shaft through the motor, though the same result may be obtained by operating lever 94 and reversing the direction of rotation of the motor shaft.

From the foregoing it will be seen that simple and efficient means is provided whereby freight or other material may be transferred from a dock or a lighter to a vessel or vice versa; that said means is so constructed as to provide an endless carrier which may be automatically lengthened or shortened at either or both ends of the apparatus and in such way as to be under absolute control of the operator; that said apparatus is complete and self-contained in that it requires no additional mechanism to be applied thereto to adapt it for the purpose for which it is used; that said apparatus is strong and comparatively inexpensive to manufacture; that said apparatus may be suitably supported and rigidly held in position above the deck of a vessel without the utilization of other means than the usual equipment which forms a part of the vessel, and that said apparatus is so made that it may be quickly lowered to the deck of a vessel and carried as a part of its equipment and quickly placed in position for loading or unloading purposes without the employment of skilled labor.

Having thus described my invention, I claim as new and desire to secure by Letters Patent:—

1. In a loading and unloading apparatus, the combination with a frame, of an endless carrier supported thereon and having free working and free supplemental slack loops, and means for lengthening or shortening said loops.

2. In a loading and unloading apparatus, the combination with a frame, of an endless carrier supported thereon and having main working and free supplemental slack loops at each end of the frame, and means for lengthening or shortening said loops.

3. In a loading and unloading apparatus, the combination with a frame, of an endless carrier supported thereon and having pendent free working and a free slack loop, together with mechanism for lengthening or shortening one loop by shortening or lengthening another.

4. The combination with a frame comprising longitudinally and transversely extending beams and tie rods suitably held together, of an endless carrier movably held on the frame, said carrier comprising two members suitably held together so as to move in parallel relation, supporting means carried by the endless carrier, means for forming working and free slack loops in said carrier and for operating said working and slack loops independently of each other so as to lengthen or shorten the same.

5. The combination with a frame, of an endless carrier movably held on the frame, and means for forming free working and free slack loops in said carrier at each end of the frame and for operating said loops independently of each other so as to lengthen or shorten the same, or for driving the chain regularly.

6. The combination with a frame comprising longitudinally and transversely extending beams and tie rods suitably held together, of an endless carrier movably held on the frame, said carrier having pendent working and free slack loops and comprising two members suitably held together so as to move in parallel relation for supporting the objects to be transferred, a motor on the frame, together with mechanism for operating said loops independently of each other so as to lengthen or shorten the same.

7. The combination with a frame, of an endless carrier supported on the frame and provided with a working loop and a free slack loop at each end of the frame, and means for operating the carrier to shorten one loop and transfer the excess to lengthen another loop.

8. In a loading and unloading apparatus, the combination with a frame, of an endless carrier supported thereon and having a working loop and a free slack portion, and means for lengthening or shortening the working loop.

9. In a loading and unloading apparatus, the combination with a frame, of an endless carrier supported thereon and having a working loop at each end and a free slack portion as a part of the carrier, and means for lengthening and shortening the working loops.

10. In a loading and unloading apparatus, the combination with a frame, of an endless carrier supported thereon and having free working and a free supplemental slack loop, means for lengthening or shortening said loops, and devices movable with the carrier for supporting the articles to be transported.

11. In a loading and unloading apparatus, the combination with a frame, of an endless carrier supported thereon and having free pendent working and free slack loops arranged in parallel relation, together with mechanism for lengthening or shortening one loop by lengthening or shortening another.

12. The combination with a frame, of an endless carrier supported on the frame and provided with a working loop at each end of the frame, a free slack portion, means for operating the carrier to shorten the working loops independently of each other and devices movable with the carrier on which the articles to be transferred may be supported.

13. In a loading and unloading apparatus, the combination with a frame, of an endless carrier supported on the frame and provided with a working and a free slack loop at each end, and mechanism for operating the working loops independently of each other and independently of the slack loops.

14. In a loading and unloading apparatus, the combination with a frame, of a motor mounted on said frame, an endless carrier having free working and free supplemental loops, and mechanism operated by the motor for lengthening or shortening the working loops independently of each other.

15. In a loading and unloading apparatus, the combination with a frame, of an endless carrier having working and slack loops, a divided shaft operatively connected to the slack loops, a shaft operatively connected to the slack and working loops, and means for operating the shafts independently or in unison.

16. In a loading and unloading machine, the combination with a frame, of an endless carrier having a plurality of free and a plurality of slack loops arranged in pairs one slack loop for each working loop, a motor, a plurality of shafts operatively connected to the motor, and a plurality of mechanisms operated by the shafts for moving the working loops independently of each other and the slack loops independently of each other and of the working loops or all of the loops together.

17. The combination with a frame, of a motor suitably mounted thereon, a divided shaft extending lengthwise of the frame and each part of said shaft independently operated by said motor, a longitudinally-extending shaft arranged at the opposite side of the motor, an endless carrier having means held thereon to support the material to be transferred and having two main working loops and two slack or supplemental loops arranged adjacent to the working loops, and mechanism operated by the shafts together or independently of each other whereby the working loops may be shortened or lengthened through the slack loops for the purpose set forth.

18. The combination with a frame, of a motor suitably mounted thereon, two supplemental shafts extending lengthwise of the frame and independently operated by said motor, a longitudinally-extending main shaft, an endless carrier chain having means held thereon to support the material to be transferred and having two working loops and two slack loops arranged adjacent to the working loops, one at each end of the frame, and mechanism operated by the shafts together or independently of each other whereby the working loops may be independently shortened or lengthened for the purpose set forth.

19. The combination with a frame, having upper and lower tracks, of a motor suitably mounted thereon, shafts extending lengthwise of the frame and independently operated by said motor, a longitudinally-extending drive shaft operated by said motor, an endless carrier chain adapted to travel along the tracks and having means held thereon to support the material to be transferred and having two main working loops and two slack loops arranged adjacent to the main loops, and mechanism engaging the chain and operated by the shafts together or independently of each other whereby the working loops may be shortened or lengthened or the chain given a regular movement.

20. The combination with a frame, of a motor suitably mounted thereon, a plurality of shafts extending lengthwise of the frame and independently operated by said motor, an endless carrier chain having two main working loops and two slack loops arranged adjacent to the main loops and entirely free of the frame, and mechanism operated by the shafts together or independently of each other whereby the chain may be given a regular movement or the working loops shortened or lengthened for the purpose set forth.

21. The combination with a frame, of a motor mounted on said frame, an upper and a lower track suitably supported on the frame and extending lengthwise thereof, an endless carrier adapted to move along the tracks and having two main working loops and two supplemental slack loops located adjacent to the working loops, two shafts in alinement with each other and extending lengthwise of the frame on one side of the motor and operated thereby, means for disengaging said shafts so as to hold the same against rotary movement or to be rotated by said motor, a longitudinally-extending main drive shaft located on the opposite side of said motor, means for operating the latter shaft by the motor or to permit said shaft to be held stationary, mechanism arranged adjacent to the working loops, means operating a part of the slack loop, and mechanism located between the working loop and the slack loop at each end of the frame and operated by the supplemental shafts for the purpose set forth.

22. The combination with a frame, of an upper and a lower track suitably supported on the frame and extending lengthwise thereof, an endless chain adapted to move along the tracks and having working and slack loops, a supplemental shaft extending lengthwise of the frame, means for disengaging said shaft so as to hold the same against rotary movement, a longitudinally-extending main drive shaft, means for operating the latter shaft or to permit said shaft to be held stationary, mechanism arranged adjacent to the working loop, means operating a part of the slack loop, and mechanism located between the working loop and the slack loop and operated by the supplemental shaft.

23. The combination with a frame, of a motor mounted on said frame, an upper and a lower track suitably supported on the frame and extending lengthwise thereof, an endless chain carrier adapted to move along the tracks and having two working loops and two slack loops located adjacent to the working loops, two supplemental shafts in alinement with each other and extending lengthwise of the frame and operated by the motor, means for disengaging said shafts so as to hold the same against rotary movement or to be rotated by said motor, a longitudinally-extending main drive shaft, means for operating the latter shaft by the motor or to permit said shaft to be held stationary, mechanism arranged adjacent to each working loop, means operating a part of each slack loop, and mechanism located between the working loop and the slack loop at each end of the frame and operated by the supplemental shafts.

24. The combination with a frame, of a motor mounted on said frame, an upper and a lower track suitably supported on the frame and extending lengthwise thereof, an endless carrier adapted to move along the tracks and having working and slack loops at each end of the frame and entirely free thereof, two supplemental shafts extending lengthwise of the frame and operated by the motor, a longitudinally-extending main drive shaft independent means including a clutch for operating each shaft independently by the motor or to permit said shaft to be held stationary, a lever for each clutch, a flexible connection for each lever to operate the same, and mechanism engaging the carrier and operated independently or simultaneously by said shafts to impart a regular movement to the entire carrier or to impart movement to a part of the carrier while another part is held stationary.

25. The combination with a frame, of an upper and a lower track suitably supported on the frame and extending lengthwise thereof, an endless carrier adapted to move along the tracks and having working and slack loops, a supplemental shaft extending lengthwise of the frame, a longitudinally-extending drive shaft, independent means including a clutch for operating each shaft independently, and means for releasing the clutches.

26. The combination with a frame, of a motor mounted on said frame, an upper and a lower track suitably supported on the frame and extending lengthwise thereof, an endless chain adapted to move along the tracks and having free working and slack loops at each end of the frame located adjacent to the main loops, two supplemental shafts extending lengthwise of the frame, a longitudinally-extending drive shaft, means for operating the shafts independently by the motor or to permit said shafts to be held stationary, together with mechanisms arranged adjacent to the loops and each operated by one of the shafts and including a worm, a worm gear and sprockets engaging said chain as a part of each mechanism.

27. The combination with a frame comprising longitudinally-extending beams and transversely and vertically arranged beams or tie bars suitably holding the frame together so as to be substantially oblong in form, of upper and lower tracks supported on the frame and extending lengthwise thereof, the said frame being so constructed as to provide an open space lengthwise of the frame at the lower part thereof, an endless carrier comprising two members arranged in parallel relation and having transferring means supported thereon and adapted to travel along the tracks, the said carrier being provided with two working loops and two slack loops one of each near each end of the frame, a motor mounted on the frame, together with mechanism operated by the motor whereby the loops may be shortened or lengthened.

This specification signed and witnessed this sixth day of March, A. D. 1908.

BENJAMIN W. TUCKER.

Witnesses:
M. TURNER,
H. LINEHAN.